United States Patent
Kim et al.

(10) Patent No.: US 9,898,428 B2
(45) Date of Patent: Feb. 20, 2018

(54) COLUMN BUS DRIVING METHOD FOR MICRO DISPLAY DEVICE

(71) Applicant: Kopin Corporation, Westborough, MA (US)

(72) Inventors: Jin Kuk Kim, San Jose, CA (US); Yong Seok Seo, Palo Alto, CA (US); Jang Ho Kim, San Jose, CA (US)

(73) Assignee: Kopin Corporation, Westborough, MA (US)

( * ) Notice: Subject to any disclaimer, the term of this patent is extended or adjusted under 35 U.S.C. 154(b) by 311 days.

(21) Appl. No.: 14/614,787

(22) Filed: Feb. 5, 2015

(65) Prior Publication Data

US 2015/0220462 A1 Aug. 6, 2015

Related U.S. Application Data

(60) Provisional application No. 61/935,928, filed on Feb. 5, 2014.

(51) Int. Cl.
*G09G 5/00* (2006.01)
*G06F 13/16* (2006.01)
*G09G 3/20* (2006.01)

(52) U.S. Cl.
CPC ............ *G06F 13/1673* (2013.01); *G09G 3/20* (2013.01); *G09G 2310/027* (2013.01); *G09G 2310/0291* (2013.01)

(58) Field of Classification Search
CPC .... G06F 3/16; G06F 13/1673; G06F 13/4027; G09G 5/00; G09G 5/395; G09G 2310/027; G09G 2310/0286; G09G 2310/0291; G09G 2310/0294; G09G 2360/18; Y02B 60/1228
USPC ........................................................ 710/310
See application file for complete search history.

(56) References Cited

U.S. PATENT DOCUMENTS 5,414,443 A * 5/1995 Kanatani .............. G09G 3/2011
345/89
5,644,729 A * 7/1997 Amini ................. G06F 13/1673
710/20

(Continued)

FOREIGN PATENT DOCUMENTS

WO WO 2015/120152 8/2015

OTHER PUBLICATIONS

International Preliminary Report on Patentability dated Aug. 9, 2016 entitled "Column Bus Driving Method for Micro Display Device".

(Continued)

*Primary Examiner* — Joe H Cheng
(74) *Attorney, Agent, or Firm* — Hamilton, Brook, Smith & Reynolds, P.C.

(57) ABSTRACT

A method of generating column signals for use by a pixel array includes connecting two or more controllable bus buffers in series. The output of each of the two or more controllable bus buffers drives an associated node. The method further includes providing a column data signal to an input of the series-connected string of two or more controllable bus buffers. The method also includes sequentially enabling each controllable bus buffer in the series-connected string of two or more controllable bus buffers, such that each node is sequentially driven. Each node is electrically coupled to an input of an associated controllable local output buffer. The method further includes sequentially enabling each of the controllable local output buffers in an order associated with the sequentially enabling of the controllable bus buffers.

19 Claims, 6 Drawing Sheets

(56) References Cited

U.S. PATENT DOCUMENTS

| | | | | |
|---|---|---|---|---|
| 5,748,165 A * | 5/1998 | Kubota | ............... | G09G 3/2011 |
| | | | | 345/96 |
| 6,157,358 A * | 12/2000 | Nakajima | ............ | G09G 3/2011 |
| | | | | 345/209 |
| 8,379,003 B2 * | 2/2013 | Kawaguchi | .......... | G09G 3/3216 |
| | | | | 345/100 |
| 2003/0067434 A1 * | 4/2003 | Haga | .................... | G09G 3/3648 |
| | | | | 345/98 |
| 2003/0169073 A1 * | 9/2003 | Takiba | ................ | G06F 13/4027 |
| | | | | 326/86 |
| 2008/0001898 A1 * | 1/2008 | Chang | ................. | G09G 3/3611 |
| | | | | 345/100 |
| 2008/0001944 A1 * | 1/2008 | Chang | ................. | G09G 3/3611 |
| | | | | 345/214 |
| 2010/0053125 A1 | 3/2010 | Kim | | |
| 2011/0205824 A1 * | 8/2011 | Kajigaya | ............. | G11C 7/1006 |
| | | | | 365/219 |
| 2015/0186267 A1 * | 7/2015 | Chun | ..................... | G06F 12/06 |
| | | | | 711/202 |

OTHER PUBLICATIONS

International Search Report and Written Opinion of PCT/US2015/014628 dated Apr. 16, 2015 entitled "Column Bus Driving Method for Micro Display Device".

* cited by examiner

COLUMN BUS DRIVING METHOD FOR MICRO DISPLAY DEVICE

RELATED APPLICATION(S)

This application claims the benefit of U.S. Provisional Application No. 61/935,928, filed on Feb. 5, 2014. The entire teachings of the above application(s) are incorporated herein by reference.

BACKGROUND OF THE INVENTION

Mobile computing devices, such as notebook PCs, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device.

While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display.

As a result, consumers are now seeking a hands-free high-quality, portable, color display solution to augment or replace their hands-dependent mobile devices. Such display solutions have practical size and weight limitations, which consequently limit available power resources (e.g., battery size). Given limited power resources, reducing the power consumption of the display increases the amount of time the display can operate on a single charge of the associated power resource.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to eyeglasses, audio headset or video eyewear.

A "wireless computing headset" device, also referred to herein as a headset computer (HSC) or head mounted display (HMD), includes one or more small, high resolution micro-displays and associated optics to magnify the image. The high resolution micro-displays can provide super video graphics array (SVGA) (800×600) resolution or extended graphic arrays (XGA) (1024×768) resolution, or higher resolutions known in the art.

A wireless computing headset contains one or more wireless computing and communication interfaces, enabling data and streaming video capability, and provides greater convenience and mobility through hands dependent devices.

For more information concerning such devices, see co-pending patent applications entitled "Mobile Wireless Display Software Platform for Controlling Other Systems and Devices," U.S. application Ser. No. 12/348,648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. Application No. 61/638,419 filed Apr. 25, 2012, each of which are incorporated herein by reference in their entirety.

As used herein "HSC" headset computers, "HMD" head mounted display device, and "wireless computing headset" device may be used interchangeably.

The embodiments described herein reduce power of a micro-display, for example one associated with a HSC by selectively enabling and disabling buffers that drive information signals to the pixel array of the micro-display. The enable control signals to the buffers enable the buffers only when they are needed for driving information to the pixel array.

In one aspect, the invention may be a method of generating column signals for use by a pixel array, including connecting two or more controllable bus buffers in series. The output of each of the two or more controllable bus buffers drives an associated node. The method further includes providing a column data signal to an input of the series-connected string of two or more controllable bus buffers, and sequentially enabling each controllable bus buffer in the series-connected string of two or more controllable bus buffers. Each node is driven sequentially with respect to time.

In one embodiment, for the sequentially enabling, the controllable bus buffer receiving the column signal is enabled first. In another embodiment, for the sequential enabling, each enabled controllable bus buffer remains enabled when a next subsequent controllable bus buffer is enabled. In one embodiment, for the sequentially enabling, the controllable bus buffer receiving the column signal is enabled last.

In one embodiment, each node is electrically coupled to an input of an associated controllable local output buffer. Another embodiment further includes sequentially enabling each of the controllable local output buffers in an order associated with the sequentially enabling of the controllable bus buffers. Another embodiment further includes disabling each of the controllable bus buffers that is not enabled, and disabling each of the controllable local output buffers that is not enabled.

In one embodiment, a controllable bus buffer that is not enabled outputs a high-impedance state. In another embodiment, a controllable bus buffer that is not enabled outputs a fixed logic state. Another embodiment further includes coordinating the sequentially enabling of each controllable bus buffer and each local output buffer with a scanning pattern associated with the pixel array.

In another aspect, the invention may be a column driver for a pixel array, including two or more controllable bus buffers connected in series, each having an output driving an associated node, and two or more controllable local output buffers, each having an input electrically coupled to one of the associated nodes and each having an output driving one or more columns of the pixel array. the column driver may further include an enable controller driving one or more bus enable inputs of the two or more controllable bus buffers, and driving one or more local output enable inputs of the two or more controllable local output buffers. The enable controller sequentially enables each controllable bus buffer in the series-connected string of two or more controllable bus buffers, such that each node is driven according to a bus sequence.

In one embodiment, the controller is configured to maintain each controllable bus buffer as enabled when a next subsequent controllable bus buffer is enabled.

In another embodiment, the enable controller is a state machine. In another embodiment, the enable controller is a code-driven processor.

In one embodiment, each local output buffer, when not enabled, outputs a high-impedance state. In another embodiment, each local output buffer, when not enabled, outputs a fixed logic state.

In one embodiment, the one or more columns of the pixel array includes one or more DACs, such that the local output buffer drives at least one DAC.

In another embodiment, the enable controller sequentially enables each controllable local output buffer such that each of the one or more columns of the pixel array is driven according to a local output sequence. In another embodiment, the bus sequence is related to with the local output sequence.

In one embodiment, the two or more controllable bus buffers includes a first controllable bus buffer having an input that receives a column data signal.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The micro-displays described herein may be used in many mobile communications and computing applications, for example a headset computer. One example of such a headset computer is disclosed in U.S. patent application Ser. No. 14/540,905, entitled "Text Selection Using HMD Head-Tracker and Voice-Command," filed Nov. 13, 2014, the entire contents of which are hereby incorporated by reference.

Figure 1:
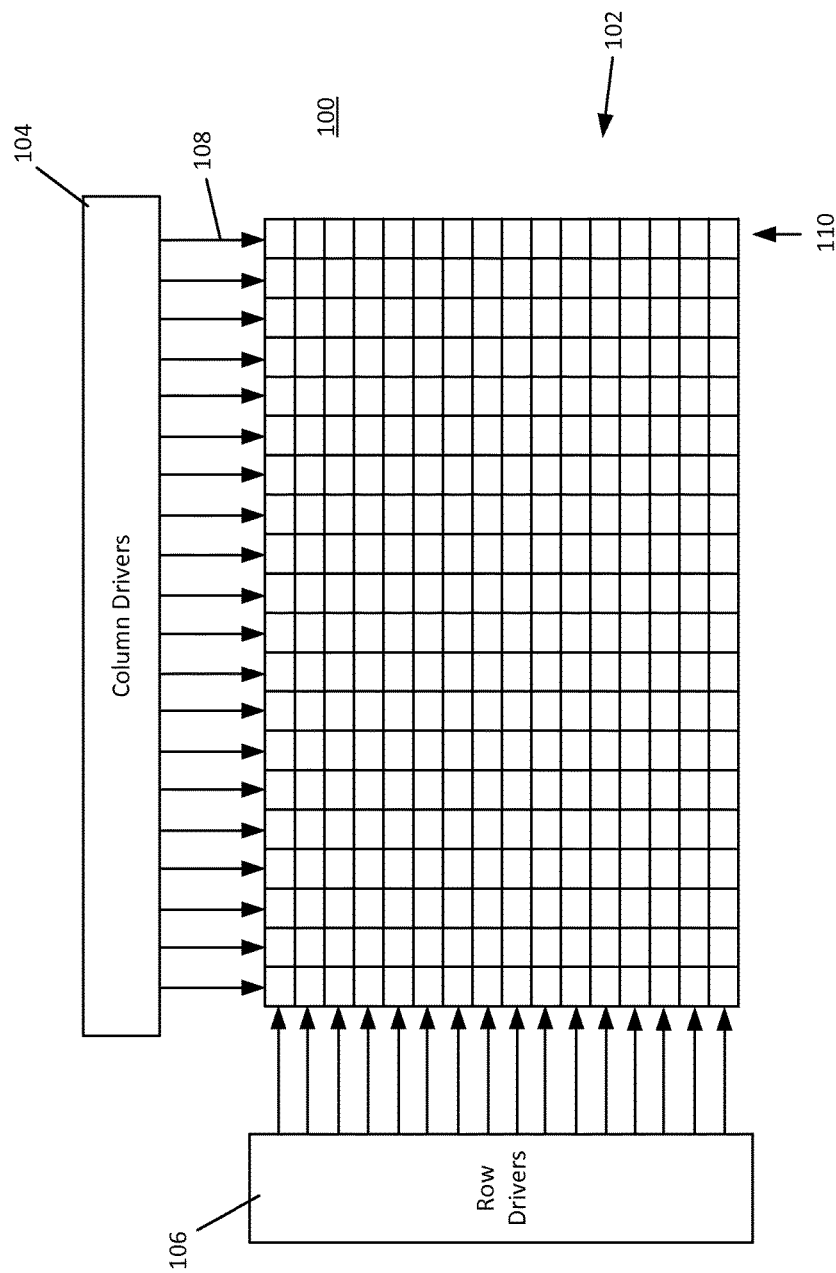
FIG. 1 illustrates a simple example of a micro-display according to the embodiments.

As shown by the example embodiment in FIG. 1, the micro-displays described herein generally include a pixel array 102 driven by a number of data and control signals. In this simple example, the micro-display 100 includes 20 columns and 16 rows for a total of 320 pixels. As described above, actual practical micro-displays typically have many more pixels (e.g., XGA with 1024 columns and 768 rows).

The micro-display includes column drivers 104 and row drivers 106 that together provide information to the pixel array 102. The column drivers 104 generally provide image information to the pixels, and the row drivers 106 provide control information to the pixels.

Figure 2:
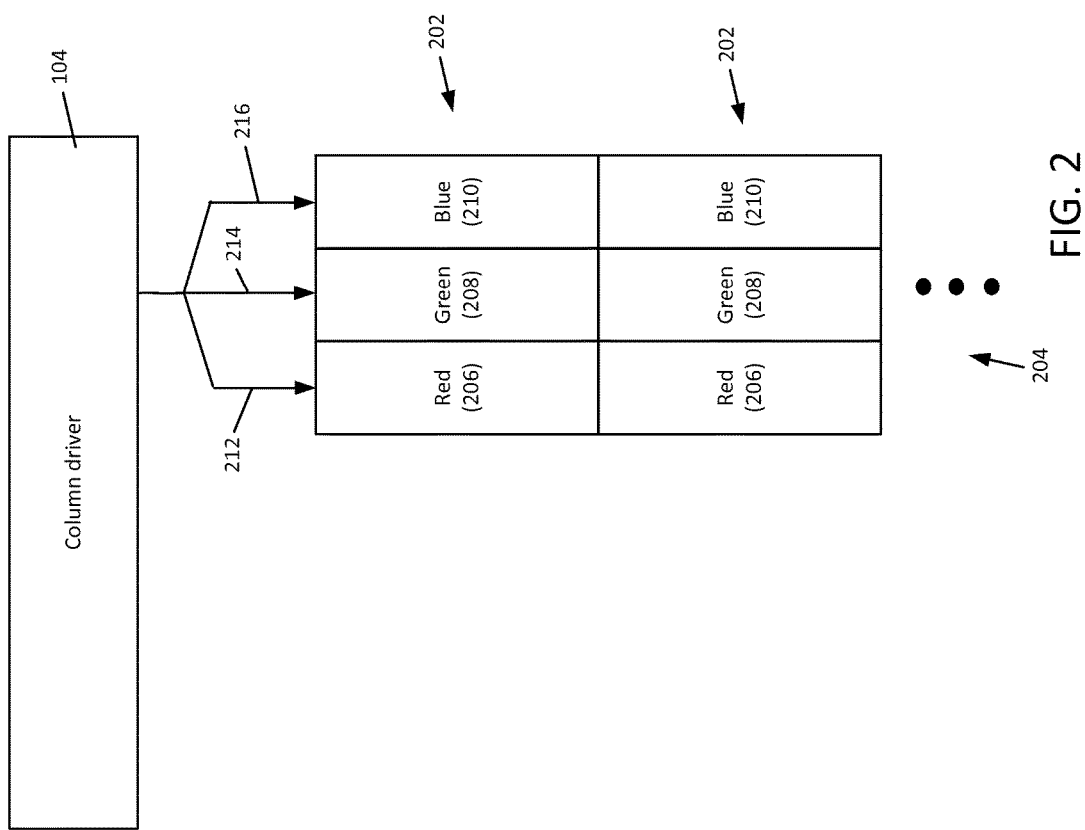
FIG. 2 illustrates an expanded view of the column driver of shown in FIG. 1.

A column driver signal 108 for a particular a particular pixel column 110 may include multiple signals. FIG. 2 shows an expanded view of a column driver 104 for a Red-Green-Blue (RGB) pixel array.

FIG. 2 shows the first two pixels 202 for a single column 204 of the array. Each pixel 202 includes a red component 206, a green component 208 and a blue component 210. For each column, the column driver 204 drives three information signals; a red signal 212, a green signal 214 and a blue signal 216. These information signals extend to all of the pixels in the column 204.

Figure 3:
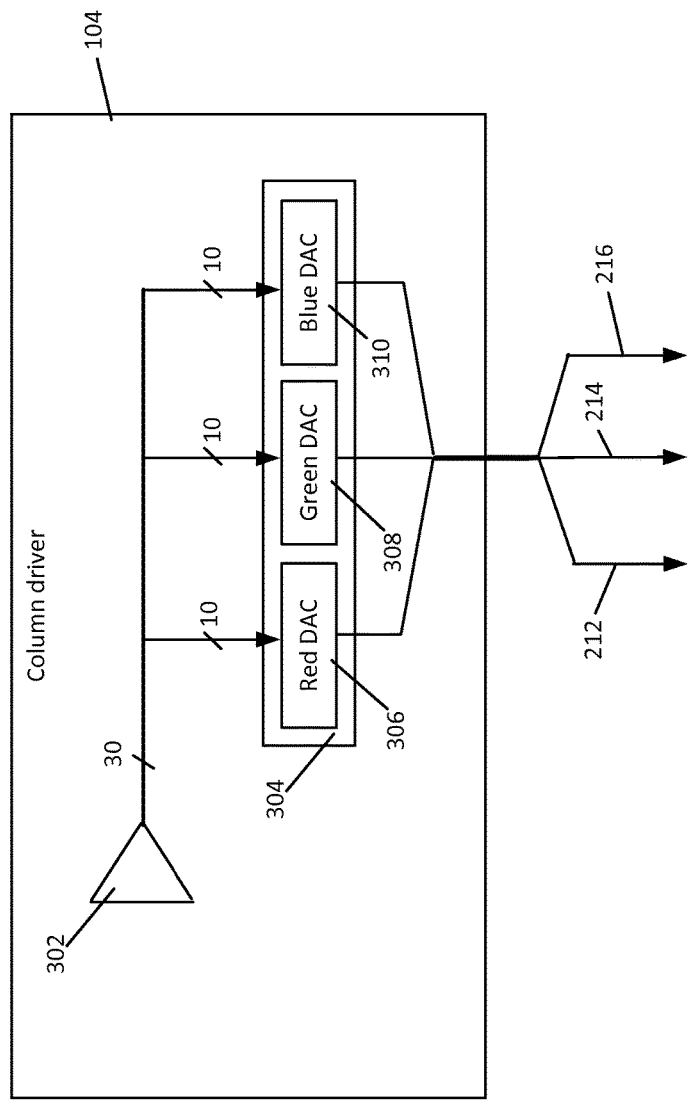
FIG. 3 shows an example of a digital to analog converter in the column driver of FIG. 1.

The information signals that drive the pixels are generally analog signals, generated from digital signals by way of a digital to analog converter (DAC). FIG. 3 shows an example of such a conversion for one pixel column. A digital buffer 302 drives 30 bits of information (10 bits of red information, 10 bits of green information and 10 bits of blue information) and provides the 30 bits to a three channel DAC 304. Each channel within the three channel DAC 304 converts 10 bits of information to an analog signal; in other words, the three channel DAC 304 includes a 10 bit red DAC 306, a 10 bit green DAC 308 and a 10 bit blue DAC 310.

Figure 4:
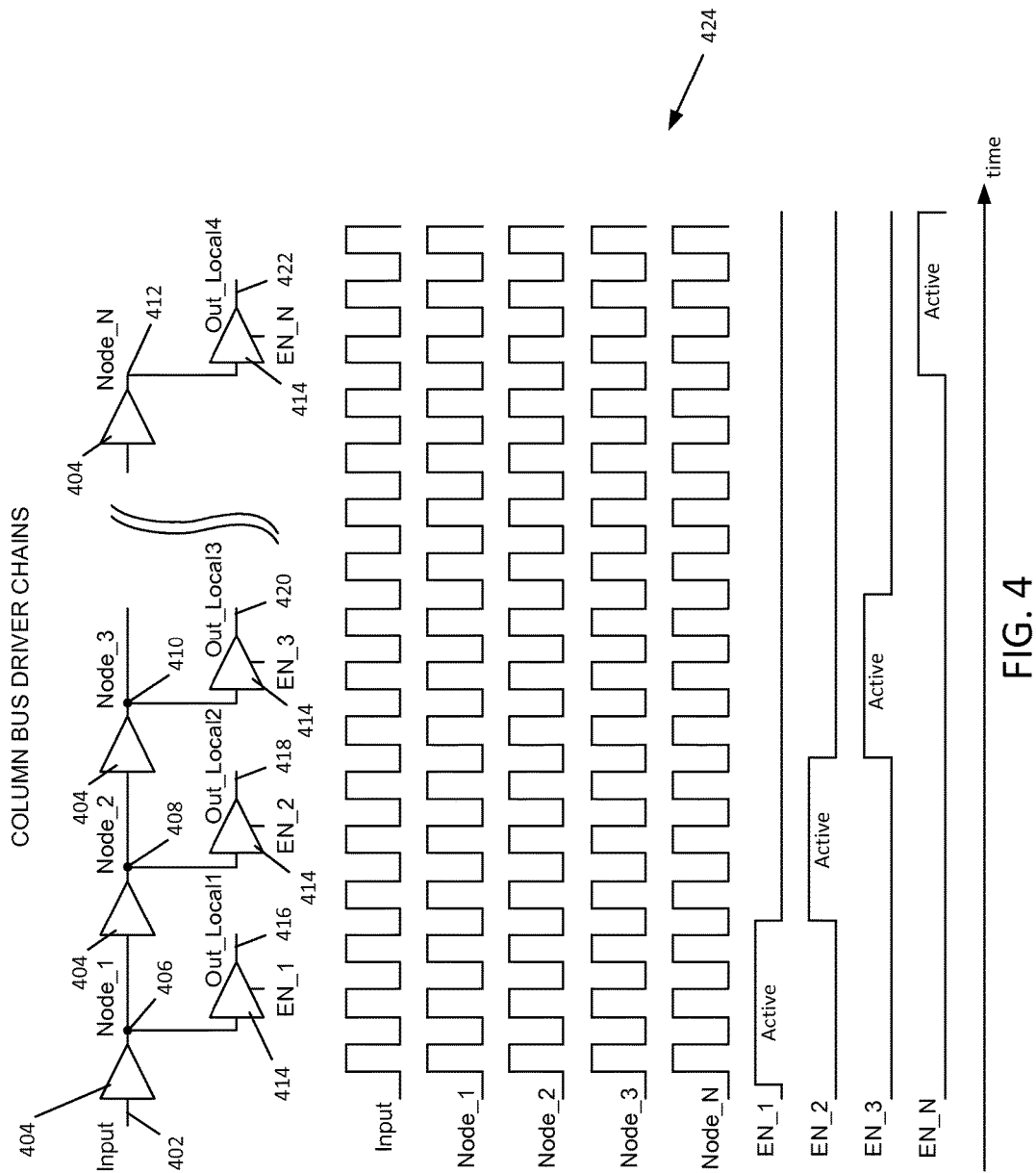
FIG. 4 shows an example of a column driver architecture.

Because the column driver 104 drives a large number of columns in a typical pixel array (e.g., as many as 1024 or more), the digital portion of the column driver that drives the DACs may consist of multiple buses or bus chains. FIG. 4 shows an example of one such column driver architecture. An information signal bus 402 is provided to a bus buffer 404, the output of which is provided to another buffer, and so on. The bus may be, for example, 30 bits as described above in FIG. 3. The output of each buffer 404 is referred to as a node—in this example, the nodes are referred to as Node_1 406, Node_2 408, Node_3 410 and Node_N 412.

Each of the nodes is presented to an input of a controlled (also referred to as controllable) local output buffer (i.e., a buffer having an output that can be enabled or disabled via a control signal applied to that buffer).

In FIG. 4, Node_1 406 is applied to the input of controlled buffer 414 to produce local output bus OUT_LOCAL_1 416. Similarly, Node_2 408 is used to form local output bus OUT_LOCAL_2 418, Node_3 410 is used to produce local output bus OUT_LOCAL_3 420, and so on.

These local output buses are used to drive a DAC or group of DACs, similar to the example shown in FIG. 3. Each local output bus may be required to drive a large number of DACs (e.g., 64 or more DACs, corresponding to 64 or more pixel columns).

One technique for reducing power used by the micro-display, is to selectively enable groups of buffers to selectively drive the associated local output buses so that they are only driving when they are needed. When the buffers are not driving the associated local output buses, they are set to drive a high-impedance state, or a fixed logical level (e.g., logic low).

The timing diagrams 424 in FIG. 4 illustrate this technique. The signals EN_1, EN_2, EN_3 through EN_N are used to selectively enable, with respect to time, the outputs 416, 418, 420 through 422, respectively.

Figure 5:
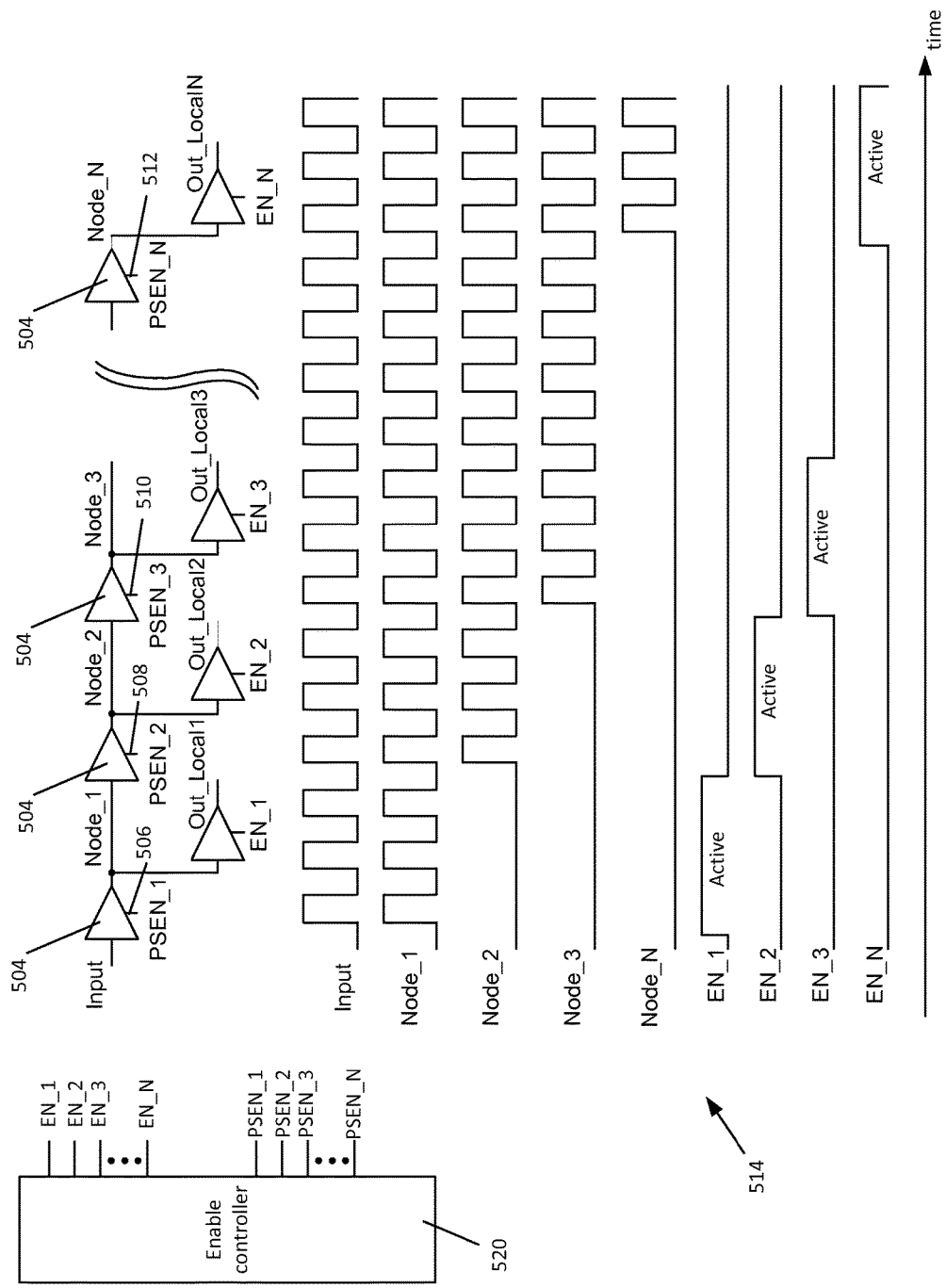
FIG. 5 shows an example of a column driver architecture according to the described embodiments.

FIG. 5 illustrates a technique for further reducing the power required by a micro-display according to the described embodiments. In the exemplary embodiment of FIG. 5, the bus buffers 404 (from FIG. 4) that produced Node_1 406, Node_2 408, Node_3 410 and Node_N 412 are replaced with controlled bus buffers. Since the bus buffers 404 in FIG. 4 could not be controlled and so were always enabled, the outputs Node_1 406, Node_2 408, Node_3 410 and Node_N 412 were constantly being driven. The total capacitance associated with driving these nodes is quite significant, particularly for micro-display arrays with a large number of pixels and wide information data fields (e.g., the exemplary 3 by 10 bit RGB array described herein).

The amount of power required by the buffers is related to the active capacitance of the drivers multiplied by the square of the voltage being driven (i.e., $CV^2$). Reducing the capacitance therefore reduces the power. The described embodiments reduce the capacitance of the drivers 404 by replacing those buffers with controlled buffers, and enabling them only when they are needed.

FIG. 5 illustrates an exemplary embodiment of the local bus portion of a column driver architecture for a pixel array according to one aspect of the invention. This embodiment controls the activate input signals PSEN_1 506, PSEN_2 508, PSEN_3 510 through PSEN_N 512 to the corresponding buffers 504, according to the timing diagram 514. As with FIG. 4, when an enable signal (e.g., EN_1) is active, it enables the output of the associated buffer. The PSEN signals are not explicitly shown in the timing diagram of FIG. 5. The PSEN signals, however, are inherently shown by the presence or lack of pulses in the Node_1, Node_2 . . . Node_N signal lines. When the PSEN_N signal is active (enabling), the Node_N pulses are present. When the PSEN_N signal is inactive (disabling), the Node_N pulses are not present.

For left to right scan, the signal PSEN_1 506 is active when EN_1 is active. As shown in the timing diagram of FIG. 5, only Node_1 is active (i.e., producing pulses) when EN_1 is active. Although the "inactivity" of Node_2, Node_3 through Node_N is shown as "low," in FIG. 5, the outputs may alternatively be in an indeterminate "high impedance" state while the associated buffers are not enabled.

Both PSEN_1 and PSEN_2 are active when EN_2 is active. As shown in FIG. 5, both Node_1 and Node_2 produce pulses during the time that EN_2 is active, while Node_3 through Node_N show no activity.

PSEN_1 & PSEN_2 & PSEN_3 are active when EN_3 is active, so that Node_1, Node_2 and Node_3 have pulses while nodes Node_N for all N greater than three are inactive. Similarly, enabling signals EN_4 through EN_N are sequentially activated until all N nodes include driven data (in this example, pulses).

In the described embodiments, the enable signals EN_1 through EN_N and PSEN_1 through PSEN_N may be generated by an enable controller 520 as shown in FIG. 5. The enable controller may be a simple state machine, a combinational logic block driven by a counter, a software or firmware code driven processor or controller, or any other such signal generator known in the art.

Sequentially activating the buffers 505 as described with respect to FIG. 5, so that the output nodes of the buffers are not all constantly active, may reduce the power requirements of the buffers 505 (averaged over time) by 40 percent or more.

For a right-to-left scan, the above process may be followed in reverse. In other words, to begin all PSEN_N may be active to begin, then each PSEN_N may be deactivated one by one (e.g., first PSEN_N−1, then PSEN_N−2, etc.) until all PSEN_N are deactivated (and their corresponding buffers 504 are not enabled).

Figure 6:
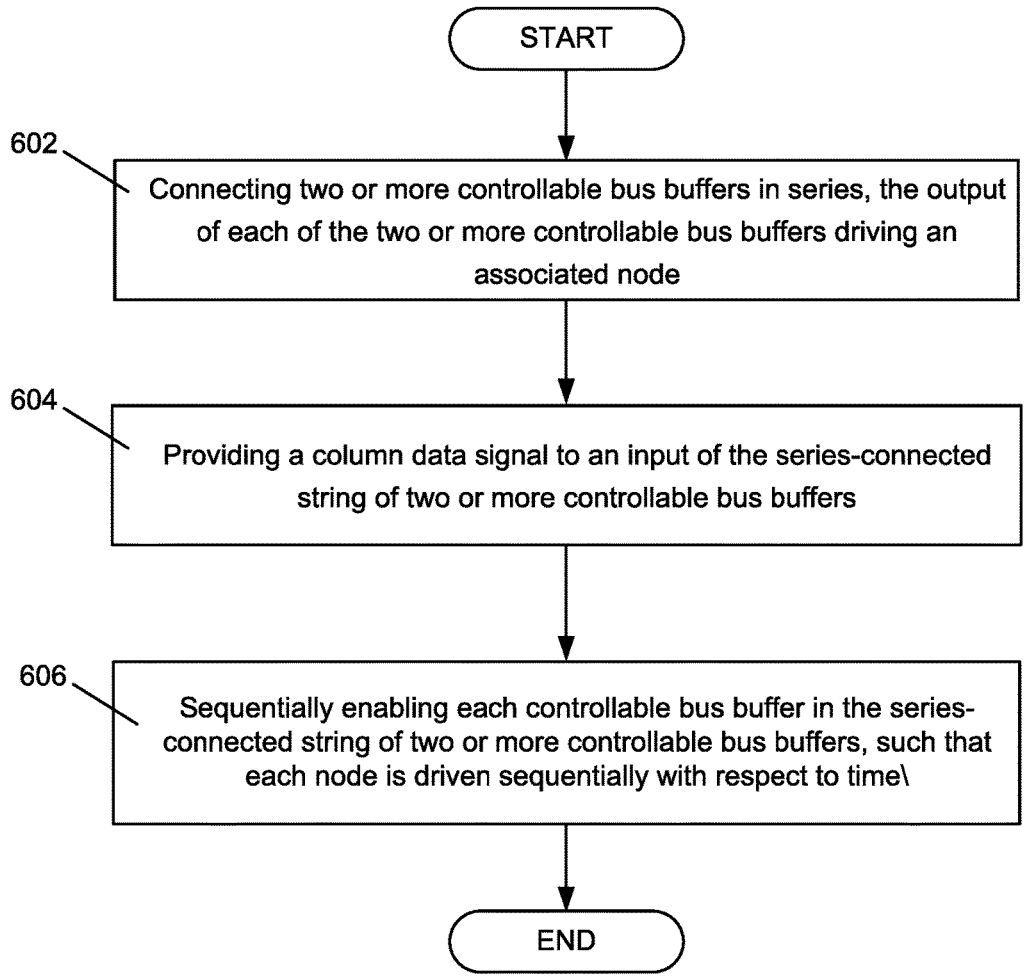
FIG. 6 illustrates an example embodiment of method of generating column signals for use by a pixel array.

FIG. 6 illustrates an example embodiment of method 600 of generating column signals for use by a pixel array. The method may comprise connecting 602 two or more controllable bus buffers in series. The output of each of the two or more controllable bus buffers may drive an associated node. The method may further comprise providing 604 a column data signal to an input of the series-connected string of two or more controllable bus buffers. The method may further comprise sequentially enabling 606 each controllable bus buffer in the series-connected string of two or more controllable bus buffers, such that each node is driven sequentially with respect to time.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored on one or more tangible computer-readable storage media and may include computer-executable instructions that may be executed by a controller or processor. The computer-executable instructions may include instructions that implement one or more embodiments of the invention. The tangible computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method of generating column signals for use by a pixel array, comprising:
   connecting two or more controllable bus buffers in series to form a series-connected string of two or more controllable bus buffers, the output of each of the two or more controllable bus buffers driving an associated node, each node is electrically coupled to an input of an associated controllable local output buffer;
   providing a column data signal to an input of the series-connected string of two or more controllable bus buffers; and
   sequentially enabling each controllable bus buffer in the series-connected string of two or more controllable bus buffers, such that each node is driven sequentially with respect to time.

2. The method of claim 1, wherein for the sequentially enabling, the controllable bus buffer receiving the column signal is enabled first.

3. The method of claim 1, wherein for the sequential enabling, each enabled controllable bus buffer remains enabled when a next subsequent controllable bus buffer is enabled.

4. The method of claim 1, wherein for the sequentially enabling, the controllable bus buffer receiving the column signal is enabled last.

5. The method of claim 1, further including sequentially enabling each of the controllable local output buffers in an order associated with the sequentially enabling of the controllable bus buffers.

6. The method of claim 1, further including disabling each of the controllable bus buffers that is not enabled, and disabling each of the controllable local output buffers that is not enabled.

7. The method of claim 1, wherein a controllable bus buffer that is not enabled outputs a high-impedance state.

8. The method of claim 1, wherein a controllable bus buffer that is not enabled outputs a fixed logic state.

9. The method of claim 1, further including-coordinating the sequentially enabling of each controllable bus buffer and each controllable local output buffer with a scanning pattern associated with the pixel array.

10. A column driver for a pixel array, comprising:
two or more controllable bus buffers connected in series to form a series-connected string of two or more controllable bus buffers, each having an output driving an associated node;
two or more controllable local output buffers, each having an input electrically coupled to one of the associated nodes and each having an output driving one or more columns of the pixel array; and
an enable controller driving one or more bus enable inputs of the series-connected string of two or more controllable bus buffers, and driving one or more local output enable inputs of the two or more controllable local output buffers;
wherein the enable controller sequentially enables each controllable bus buffer in the series-connected string of two or more controllable bus buffers, such that each node is driven according to a bus sequence.

11. The column driver of claim 10, wherein the enable controller is configured to maintain each controllable bus buffer as enabled when a next subsequent controllable bus buffer is enabled.

12. The column driver of claim 10, wherein the enable controller is a state machine.

13. The column driver of claim 10, wherein the enable controller is a code-driven processor.

14. The column driver of claim 10, wherein each controllable local output buffer, when not enabled, outputs a high-impedance state.

15. The column driver of claim 10, wherein each controllable local output buffer, when not enabled, outputs a fixed logic state.

16. The column driver of claim 10, wherein the one or more columns of the pixel array includes one or more DACs, such that the controllable local output buffer drives at least one DAC.

17. The column driver of claim 10, wherein the enable controller sequentially enables each controllable local output buffer such that each of the one or more columns of the pixel array is driven according to a local output sequence.

18. The column driver of claim 17, wherein the bus sequence is related to with the local output sequence.

19. The column driver of claim 10, wherein the two or more controllable bus buffers includes a first controllable bus buffer having an input that receives a column data signal.

* * * * *